United States Patent [19]
Siebke et al.

[11] 3,974,040
[45] Aug. 10, 1976

[54] CONTROLS FOR MAINTAINING LOW NITROGEN OXIDES CONTENT IN INTERNAL COMBUSTION ENGINE EXHAUST GASES

[75] Inventors: Hans Siebke; Brigitte Moro; Manfred Schönborn; Horst Jahnke, all of Gerlingen, Germany

[73] Assignee: Robert Bosch G.m.b.H., Stuttgart, Germany

[22] Filed: June 28, 1974

[21] Appl. No.: 484,301

[30] Foreign Application Priority Data
July 12, 1973 Germany.............................. 2335403

[52] U.S. Cl. ............................ 204/1 T; 204/195 R; 204/195 P; 204/195 S; 60/276; 60/285
[51] Int. Cl.²......................................... G01N 27/46
[58] Field of Search........... 23/232 E, 254 E, 255 E; 204/195 R, 1 T, 1 Y, 1 N; 60/276

[56] References Cited
UNITED STATES PATENTS

| | | | |
|---|---|---|---|
| 2,991,412 | 7/1961 | Kordesch | 204/195 R |
| 3,223,597 | 12/1965 | Hersch | 204/1 T |
| 3,291,705 | 12/1966 | Hersch | 204/195 R |
| 3,314,863 | 4/1967 | Hersch et al. | 204/195 R |
| 3,622,487 | 11/1971 | Chand et al. | 204/1 N |
| 3,719,564 | 3/1973 | Lilly et al. | 204/1 S |
| 3,768,259 | 10/1973 | Carnahan et al. | 60/276 |
| 3,821,090 | 6/1974 | Topol et al. | 204/1 T |
| 3,827,237 | 8/1974 | Linder et al. | 60/276 |
| 3,930,884 | 1/1976 | Zimmerman et al. | 136/120 FC |

*Primary Examiner*—T. Tung
*Attorney, Agent, or Firm*—Flynn & Frishauf

[57] ABSTRACT

Control system and apparatus for measuring and monitoring the nitrogen oxides content of internal combustion engine exhaust gases. The exhaust gases are contacted with the reducing electrode of a sensor cell having a predetermined potential established between the cell electrodes so that the reducing electrode is able to reduce both the nitrogen oxides and oxygen content of the exhaust gas. The current flowing through the sensor cell is measured to determine whether the nitrogen oxides content of the exhaust gas is sufficiently low.

9 Claims, 2 Drawing Figures

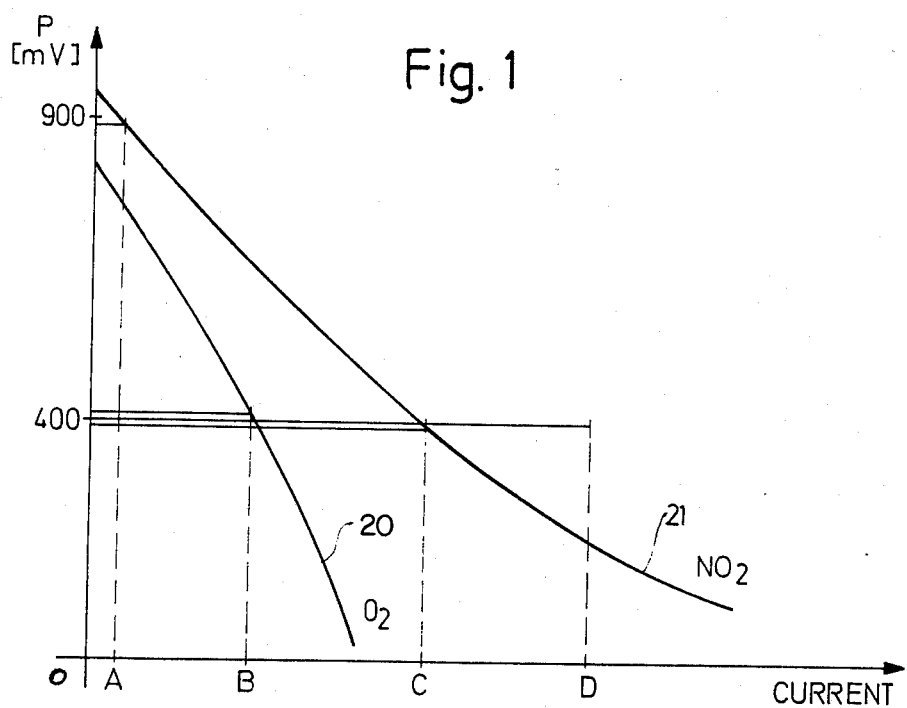
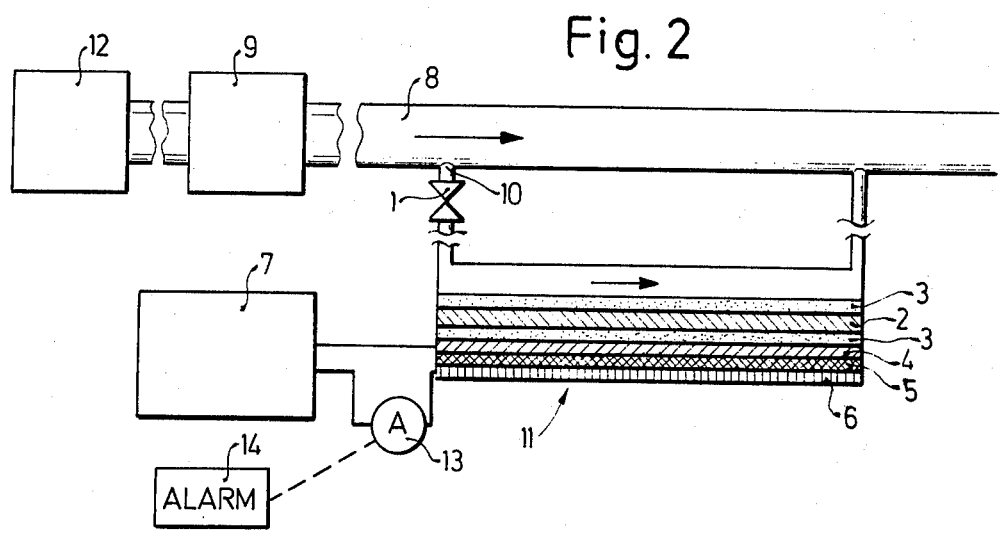

CONTROLS FOR MAINTAINING LOW NITROGEN OXIDES CONTENT IN INTERNAL COMBUSTION ENGINE EXHAUST GASES

RELATED PATENTS

The following four patents disclose exhaust control systems:
U.S. Pat. No. 3,759,232, issued Sept. 18, 1973;
U.S. Pat. No. 3,827,237, issued Aug. 6, 1974;
U.S. Pat. No. 3,890,946, issued June 24, 1975;
U.S. Pat. No. 3,930,884, issued Jan. 6, 1976 discloses a preparation of CoTAA, i.e., the cobalt complex of 5,14-dihydro-dibenzo-(5,9,14,18)tetraaza(14)-annulene.

The present invention provides a method of monitoring the content of nitrogen oxides in exhaust gases from internal combustion engines and also provides a sensor useful in said method.

Exhaust gases from internal combustion engines contain carbon monoxide, nitrogen oxides, and also uncombusted or only partially combusted hydrocarbons, all of which contribute to air pollution. In order to decrease air pollution caused by these materials to a minimum, it is necessary to remove as large an amount as possible of these materials from the exhaust gases from internal combustion engines and motor vehicles driven by these engines. In order to accomplish this, carbon monoxide and the hydrocarbons must be converted to the maximum extent possible to their highest oxidation state. For carbon monoxide this is carbon dioxide and for the hydrocarbons, the product also contains water. The nitrogen oxides should be reduced to nitrogen.

The foregoing noxious materials, i.e., carbon monoxide, hydrocarbons, and nitrogen oxides may be converted into the innoxious compounds, carbon dioxide, nitrogen and water in a catalytic afterburner. The gases are contacted with a catalyst at temperatures above about 600°C in the catalytic afterburner. The operational characteristics of the catalyst must be monitored because the catalyst becomes less active and often substantially inactive after prolonged service. The loss in catalytic activity is dependent upon the temperature and time of service which largely reflects the amount of use of the internal combustion engine. Loss of activity is normally not noticeable in the characteristics of the motor vehicle drive which is powered by the internal combustion engine. The differences in the exhaust gas composition from an internal combustion engine with and without passage through a catalytic afterburner are specified in the following table:

| Component | Not Treated In Catalytic Afterburner (In ppm) | Treated In Catalytic Afterburner (In ppm) |
|---|---|---|
| carbon monoxide, CO | 5,000 | 2,000 |
| hydrocarbons, HC | 1,200 | 150 |
| nitric oxides, $NO_x$ | 2,000 | 50 |
| oxygen, $O_2$ | 5,000 | 200 |

The values in parts per million specified are approximate values. The exhaust gas was from an internal combustion engine operating with an amount of oxygen sufficient to give lambda value of 0.995. This indicates a very slight insufficiency of oxygen based on the theoretical quantity of oxygen necessary to produce an equilibrium composition which is defined as a lambda value of 1. The internal combustion engine operated with an average of 3,000 rpm and a suction pipe pressure of 460 Torr. The results in the table indicate that the largest difference in concentrations are for the nitrogen oxide and oxygen components of the exhaust gas. It is therefore possible to utilize the difference in the quantities of at least one of these components to monitor the effectiveness of the catalytic afterburner. In connection with the nitrogen oxides, it is noted that the thermodynamic equilibrium between (i) nitrogen monoxide and oxygen, and (ii) nitrogen dioxide, under the operating conditions as specified for the internal combustion engine described hereinbefore, lies very largely in the direction of nitrogen dioxide. It has therefore been proposed to monitor the effectiveness of the catalytic afterburner using a probe (or sensor) which only is affected by nitrogen dioxide. The advantages of such a monitoring method is that in addition to the effectiveness of the catalytic afterburner, it is also possible to measure the content of nitrogen dioxide in the exhaust gas if the exhaust gas also contains an excess of oxygen. However, there is a disadvantage in such a procedure in that it is based on the presumption that the thermodynamic equilibrium is achieved. This presumption is not certain under the conditions of operation of an internal combustion engine in a motor vehicle. It is therefore necessary in a measuring method which only responds to the nitrogen dioxide, to connect a catalyst layer in series with a sensor which substantially achieves thermodynamic equilibrium between nitrogen dioxide and the mixture of oxygen and lower nitrogen oxides.

It is an object of the present invention to provide a sensor which is useful in a method of monitoring the nitrogen oxide content of exhaust gases from internal combustion engines and therefore for monitoring the effectiveness of the catalytic afterburner which is not based upon the hypothesis that the thermodynamic equilibrium for the following reaction has been achieved:

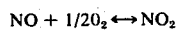

$$NO + 1/2O_2 \leftrightarrow NO_2$$

Such a method and sensor are useful for monitoring the effectiveness of catalytic afterburners connected to the exhaust end of internal combustion engines since such exhaust gases do not necessarily contain the nitrogen oxides and oxygen in the aforeidentified thermodynamic equilibrium condition.

SUBJECT MATTER OF THE INVENTION

The present invention provides a control system for monitoring the effectiveness of a catalytic afterburner which lowers among others the nitrogen oxides and also the oxygen content of exhaust gases to an acceptable low predetermined level. The invention also provides a method for measuring the nitrogen oxides and oxygen content of the exhaust gases. This is accomplished by contacting the exhaust gases with a sensor cell having a catalytic reducing electrode which is able to reduce nitrogen oxides and oxygen at potentials below the rest potential of oxygen. When a potential below the rest potential of oxygen, and preferably between about 300 and 700 mV below the rest potential of oxygen, is applied to the reducing electrode, and the exhaust gases brought in contact with the reducing electrode, a current flows between the electrodes of the sensor cell which increases with increases in the total nitrogen oxides and oxygen content in the exhaust gases. The invention is further described in the drawings in which FIG. 1 graphically depicts the currents flowing at different potentials when exhaust gas or gases are contacted with the reducing electrode of the sensor cell.

FIG. 2 schematically illustrates the apparatus of the invention.

The ordinate of FIG. 1 represents the potential of the reducing electrode against hydrogen in same solution and the abscissa represents the current obtained when contacting nitrogen dioxide and/or oxygen with the reducing electrode of the sensor cell. Curve 20 represents the dependence of the current generated by the reduction of oxygen with the potential and curve 21 represents the dependence of the current resulting from the reduction of nitrogen dioxide and changes in potential. If a potential of 900 mV against hydrogen in same solution is applied, a current OA is obtained resulting only from the reduction of the nitrogen dioxide. This is initially a comparatively small current which becomes even smaller if the thermodynamic equilibrium is not reached as a consequence of kinetic restraints. If it were attempted to measure such values in a consistent manner and utilize such values in control system for the exhaust gases, it would be necessary to utilize complex and expensive electronic equipment.

However, if the potential applied lies 300-700 mV under the rest (steady) potential of oxygen, the resulting cathodic current has two components. This is illustrated in FIG. 1 with an applied potential of 400 mV.

The nitrogen dioxide reduction causes a current flow. The reduction of oxygen also causes a current to flow, as illustrated in the following equations:

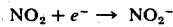

$$NO_2 + e^- \rightarrow NO_2^-$$

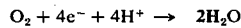

$$O_2 + 4e^- + 4H^+ \rightarrow 2H_2O$$

The current flowing as a consequence of the reduction of the nitrogen oxide can be a diffusion limited current by the proper dimensioning of the sensor. Similarly, the current flowing as a result of the oxygen reduction also may be a diffusion limited current, but this is frequently not the case.

Partial current OC results from the reduction of the nitrogen oxide and partial current OB results from the reduction of the oxygen. A total current OD results as the sum of these two partial currents.

If the equilibrium for the equation NO + 1/2 $O_2 \leftrightarrow$ $NO_2$ does not correspond to the thermodynamic value, that is if the gas mixture contains more NO than that corresponding to the thermodynamic equilibrium, the partial current resulting from the $NO_2$ reduction becomes smaller, but at the same time the partial current resulting from the $O_2$ reduction increases since following the dictates of the aforenoted equilibrium, a larger quantity of oxygen would be present in the gas mixture. The foregoing is based on the premise that the oxygen content in the exhaust gases in relation to the totality of all the reactions taking place does not substantially exceed the equilibrium value so that, as a consequence, the oxygen content may be considered representative of the nitrogen oxides concentration. Since proper operation of an internal combustion engine, i.e., operation which is not so lean that there is gross incomplete combustion of oxygen or so rich that the exhaust gases contain very large amounts of unburned hydrocarbons, meets this condition, the system of the present invention is operative to measure and/or monitor the concentration of nitrogen oxides in the exhaust gas from internal combustion engines. Of course, if additional air is supplied to the exhaust gas system, the foregoing equilibrium does not necessarily apply and, accordingly, the sensor would be positioned in the exhaust gas system before any additional air intake.

Since the current results from the total of two different components, as a rule no linear relationship exists between the concentrations of the reducible components and the amount of current. The sensor therefore is preferably calibrated in such a manner that it indicates the functioning capacity of the catalytic afterburner in the form of a yes/no decision. To accomplish this, the current from the sensor cell is conveyed to a monitoring apparatus such as ammeter 13 which in turn is connected to a signaling device 14 of an acoustic or optical nature when the current exceeds a predetermined limiting value, which is several times (for example, 3–7 times) the current that flows when the nitrogen oxides are at the desirable low concentration in the exhaust gases.

The preferred catalytic materials which function as the reducing electrode to reduce both nitrogen oxides and oxygen are the metal chelates and, preferably, the phthalocyanines and the 5,14-dehydro-dibenzo(5,9,14,18)-tetraaza(14)-annulenes and particularly the cobalt chelates thereof; carbon, particularly in the form of graphite or carbon black obtained from decomposition of acetylene; and the platinum metals, particularly, Pt, Pd, Ru, and their alloys.

FIG. 2 depicts a sensor according to the present invention. It also depicts its relationship relative to the flow of exhaust gases when it is used for monitoring the nitrogen oxide content of exhaust gases and for monitoring the effectiveness of the catalytic afterburner. The sensor is positioned to measure the nitrogen oxide content of the exhaust gas from an internal combustion engine 12 used to drive a motor vehicle. When the sensor is also used to monitor the effectiveness of a catalytic afterburner, it is positioned in the exhaust stream 8 from the catalytic afterburner 9 or on a bypass 10 off such exhaust stream. Since the sensor is a cell 11 which has a specified service life based upon the amount of contact with exhaust gases, it is advantageous that the sensor be placed in a bypass rather than in the main exhaust stream. It is also advantageous that the exhaust gas should only be admitted to contact with the sensor on an intermittent rather than a continuous basis. This results in a prolongation of the service life of the sensor. This prolongation of the service life of the sensor is a consequence of the fact that if there is less frequent contact with the exhaust gases, there are smaller quantities of reaction products or other substances from the exhaust gas which may dissolve in the electrolyte of the sensor. The smaller such amounts are for a given period of time, the greater is the service life of the sensor. The control of the exhaust gases to the sensor in FIG. 2 is effected by the illustrated valve 1.

The sensor cell is formed from six layers. The exhaust gas first contacts an activated carbon layer 2 which functions as a diffusion inhibitor. Carbon layer 2 is supported between two porous supporting layers 3 formed from polytetrafluoroethyene (PTFE). The PTFE layer is in contact with the catalyst layer 4. The method for producing the catalyst layer 4 and the composition thereof are further illustrated in the Examples. Any substance having sufficient conductivity may be used as the electrolyte if it has a pH of 0 to 5. Sulphuric acid and phosphoric acid in liquid form or absorbed in a porous inert matrix, for example, diatomaceous earth, may be used. Ion exchange membranes are also preferred embodiments of the electrolyte. The electrolyte layer 5 also contacts the electrode 6 at which oxidation occurs and which also serves as a reference electrode. The electrode 6 is required to maintain its constant potential at the relatively minor amounts of current which flow. A silver/silver sulphate electrode, a lead/lead sulphate electrode, and a quinhydrone electrode have been found to be suitable for use as the electrode 6.

A constant potential is applied between the catalyst electrode 4 and the electrode 6. The constant potential is applied by connecting each of these electrodes with a potentiostatic regulator 7 illustrated as a block in FIG. 2. Potentiostatic regulators of this type are known. These regulators 7 are also commonly referred to as controlled voltage sources. The constant potential applied is preferably between 200 and 600 mV, and optionally is between 400 and 500 mV, with reference to the hydrogen electrode in the same solution. When exhaust gas is applied to the sensor, the current which flows at the said applied potential is measured by ammeter 13 and is a measure of the reduction of nitrogen oxide ($NO_2$) and oxygen which occurs at the catalyst layer. If this current value exceeds a specified experimentally predetermined limiting value, then the catalytic afterburner through which the exhaust gases flow before being placed in contact with the sensor no longer functions effectively. This lack of effective functioning is indicated by an unduly high nitrogen oxide-oxygen content in the exhaust gases after passage through the catalytic afterburner. When the current exceeds the aforesaid predetermining limiting value, it may be used to operate a warning signal 14.

The invention is further illustrated in the following Examples which particularly illustrate the process for manufacturing specified catalysts and also illustrates the process for determining the effectiveness of the catalyst in operation in the sensor.

EXAMPLE I 2.5 grams of cobalt phthalocyanine are dissolved in concentrated sulphuric acid at room temperature. 2.5 grams of carbon black formed from acetylene are added to this solution and form a suspension. Distilled water is then added and the phthalocyanine is deposited on the carbon black. The solution is then filtered and after drying, 10 mg of the resultant catalyst are stirred to form a paste with methanol and then brushed onto a porous Teflon foil having a diameter of 32 mm. This is then used as the catalytic electrode. It is tested in the form of a half cell in 4.5 N $H_2SO_4$ at room temperature with reference to a hydrogen electrode in the same solution.

When the potential of this electrode is set at 900 mV, measured with reference to the hydrogen electrode in the same solution, and a gas which contains approximately 400 ppm of $NO_2$ is contacted with the electrode then a cathodic current of about 300 microamps is obtained. When the gas contains only about 40 ppm of $NO_2$, the corresponding current is about 32 microamps.

In order to measure the cathodic current flowing as a result of $NO_2$ in a gas stream in contact with an electrode when the electrode has a potential between 200 and 600 mV, it is necessary to use complex equipment because the $NO_2$ is generally stabilized with an excess of oxygen. However, since the aforeidentified values for the current flow results from a diffusion limit current, the presumption may be made that the current flowing at the lower potentials is of the same order as those measured at 900 mV. This presumption is confirmed by the experiments hereinafter (see Examples III and IV).

Tests of the same electrode operated and contacted with an oxygen-nitrogen mixture, when set at a potential of 400 mV, obtained the following currents when the gases contained an oxygen content of 0.02% or 0.5% by volume, respectively:

0.02 vol.% $O_2$: 28 μA 0.5 vol.-% $O_2$: 270 μA

These Examples establish that reduction currents which are measurable may be obtained when using the catalyst of this Example in contact with $NO_2$-containing gases and also with oxygen-containing gases which do not contain $NO_2$.

EXAMPLE II 1.2 g of the cobalt complex of 5,14-dihydro-dibenzo-(5,9,14,18)tetraaza(14)-annulene (CoTAA) are mixed with 2.4 g of a carbon having a large surface area, i.e., a specific surface of about 1,750 m²/g and thermally activated for 16 hours at 420°C and thereafter for one hour at 950°C under nitrogen. Any soluble cobalt products which may have been formed by this treatment are dissolved out by washing (decanting) the reaction product for three days in 4.5 N $H_2SO_4$. Thereafter the reaction product is stirred into a paste with methanol and brushed onto a porous PTFE foil of about 6 cm² surface to form a coating having a coating density of 3 mg/cm². This electrode is installed in a holder and contacted with a graphite felt disk as well as with a perforated acid-resistant conductor plate. A porous soft-lead plate of 7.5 cm² surface is used as the other electrode. 4.5 N $H_2SO_4$ is absorbed in finely divided silicic acid in a ratio of 1:9 is used as the electrolyte. $NO_2$-containing gases in contact with the hydrophobe PTFE-foil of this electrode, having $NO_2$-concentrations of 38 and 500 ppm, respectively, produce currents of 74 and 830 μA, respectively, when the electrode potential is 900 mV. The current values at 400 and 500 mV are substantially the same as at 900 mV. This establishes that these are diffusion limit currents.

When the electrode is operated with an oxygen-containing gas mixture, the following values were measured:

| electrode potential | nitric oxide | oxygen | current |
| --- | --- | --- | --- |
| 400 mV | 38 ppm | 0.02 % | 75 μA |
| 400 mV | 500 ppm | 0.5 % | 780 μA |
| 500 mV | 38 ppm | 0.02 % | 50 μA |
| 500 mV | 500 ppm | 0.5 % | 430 μA |

EXAMPLE III

A sensor produced in accordance with Example II was positioned in a bypass off the exhaust stream from the catalytic afterburner which treated the exhaust gases from the internal combustion engine of a motor vehicle. When the catalyst operated effectively, the exhaust gas contained 40 ppm of nitrogen oxides, i.e., approximately 37 ppm of NO and 3 ppm of $NO_2$, and also contained about 0.02% of oxygen. When the electrode potential of the sensor was set at 400 mV, a current of 83 microamps was obtained. When the catalyst failed the concentration of NO rose to 2,250 ppm, and the oxygen concentration rose to 0.5%. Under the same conditions of test, the current was 1.2 mA. This is larger by one order of magnitude than the current obtained when the cataltyic afterburner was operating effectively. This difference of magnitude of the current from the sensor may be used to operate a signal that there is a disorder in the functioning of the catalyst. To operate such a signal, a limiting value of the current which must be exceeded to operate the signal is set. The limiting value in the foregoing arrangement is set between 300 and 500 microamps.

EXAMPLE IV

A sensor which was prepared following the preceding Example I, except that it contained a larger coating density of 6.8 $mg/cm^2$ cobalt-phthalocyanine/carbon black-catalyst. It was installed in a bypass off the exhaust gas from a motor vehicle. The following values were measured:

| An effectively working catalyst: | | |
|---|---|---|
| exhaust gas content | electrode potential | cathodic current |
| 0.02 % $O_2$ 40 ppm NO | 400 mV | 35 μA |
| 0.02 % $O_2$ 40 ppm NO | 500 mV | 22 μA |
| A catalyst with impaired performance: | | |
| 0.5 % $O_2$ 2250 ppm NO | 400 mV | 380 μA |
| 0.5 % $O_2$ 2250 ppm NO | 500 mV | 280 μA |

The relationship of NO to $NO_2$ was the same as in Example III. The current increases by more than one order of magnitude when the catalyst fails. In this system the limit value of the current which, when exceeded, triggers a signal, is set at 80 to 100 μA at a 400 mV electrode potential, or set at 50 to 70 μA at a 500 mV potential, respectively.

We claim:
1. A method for monitoring the nitrogen oxides and oxygen content of exhaust gas from an internal combustion engine using a sensor cell which comprises
   a. a catalytic oxygen reducing electrode which also reduces nitrogen oxides at potentials below the rest potential of oxygen,
   b. an oxidizing electrode,
   c. an aqueous electrolyte connecting said electrodes, and
   d. a porous gas diffusion inhibitor layer covering the side of said oxygen reducing electrode adapted to be contacted with said exhaust gas; said method comprising applying a potential to said oxygen reducing electrode, said potential being between about 300 and 700 mV below the rest potential of oxygen when measured in the same electrolyte, contacting a portion of said exhaust gas with said porous gas diffusion inhibitor layer, a portion of said contacting exhaust gas passing through said diffusion inhibiting layer to said oxygen reducing electrode, and measuring the current that flows between said oxygen reducing electrode and said oxidizing electrode as a result of the reduction of nitrogen oxides and oxygen in contact with said oxygen reducing electrode.

2. The method of claim 1 wherein said catalytic oxygen reducing electrode contains at least one catalytic material selected from the group consisting of catalytic metal chelates, carbon, and platinum metals.

3. The method of claim 1 wherein portions of said exhaust gas are intermittently contacted with said reducing electrode of said sensor cell.

4. The method of claim 3 wherein said catalytic oxygen reducing electrode contains at least one catalytic material selected from the group consisting of catalytic metal chelates, carbon, and platinum metals, and wherein said oxidizing electrode is selected from the group consisting of a silver-silver sulphate electrode, a lead-lead sulphate electrode, and a quinhydrone electrode.

5. The method of claim 4 wherein said catalytic oxygen reducing electrode contains a catalyst material selected from the group consisting of the metal complexes of the phthalo/cyanines and the 5,14-dihydrodibenzo (5,9,14,18)-tetraaza(14)-annulenes; graphite; and carbon black obtained from acetylene.

6. The method of claim 5 wherein the potential applied to said catalytic oxygen reducing electrode is between about 400 and 500 mV below the rest.

7. The method of claim 5 wherein said electrolyte has a pH of 0 to 5.

8. The method of claim 1 wherein said catalytic oxygen reducing electrode contains at least one catalytic material selected from the group consisting of metal chelates, carbon, and platinum metals, and wherein said oxidizing electrode is selected from the group consisting of a silver-silver sulphate electrode, a lead-lead sulphate electrode and a quinhydrone electrode.

9. The method of claim 8 wherein said electrolyte has a pH of 0 to 5.

* * * * *